(12) United States Patent
Lai et al.

(10) Patent No.: US 9,081,421 B1
(45) Date of Patent: Jul. 14, 2015

(54) USER INTERFACE FOR PRESENTING HETEROGENEOUS CONTENT

(71) Applicant: LinkedIn Corporation, Mountain View, CA (US)

(72) Inventors: Albert J. Lai, San Francisco, CA (US); Lindsay Norman, San Francisco, CA (US); Ankit Gupta, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 4 days.

(21) Appl. No.: 14/320,109

(22) Filed: Jun. 30, 2014

(51) Int. Cl.
*G06F 3/0485* (2013.01)
*G06F 3/01* (2006.01)
*G06F 3/0484* (2013.01)

(52) U.S. Cl.
CPC .............. *G06F 3/017* (2013.01); *G06F 3/0485* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 8,375,304 B2 * | 2/2013 | Swenson et al. ............... | 715/738 |
| 2011/0022957 A1 * | 1/2011 | Lee ................. | 715/702 |
| 2012/0304292 A1 * | 11/2012 | Liu et al. ......................... | 726/22 |
| 2013/0047122 A1 * | 2/2013 | Ijas et al. ....................... | 715/821 |
| 2013/0111395 A1 * | 5/2013 | Ying et al. ...................... | 715/783 |
| 2013/0124980 A1 * | 5/2013 | Hudson et al. ................. | 715/243 |
| 2013/0198663 A1 * | 8/2013 | Matas et al. .................... | 715/765 |
| 2013/0254705 A1 * | 9/2013 | Mooring et al. ............... | 715/784 |
| 2013/0263052 A1 * | 10/2013 | Fong et al. ..................... | 715/825 |
| 2013/0328811 A1 * | 12/2013 | Henkin et al. ................. | 345/173 |
| 2014/0149905 A1 * | 5/2014 | Woo et al. ...................... | 715/768 |
| 2014/0181645 A1 * | 6/2014 | MacBeth ....................... | 715/249 |

OTHER PUBLICATIONS

"How to use the Automatic Picture Download Setting feature to determine how Outlook 2003 blocks external HTML content". Microsoft [online], [retrieved on Sep. 2, 2014]. Retrieved from the Internet (URL: https://web.archive.org/web/20041020075556/ http://support.microsoft.com/kb/831608), Oct. 20 2004.*

* cited by examiner

*Primary Examiner* — Matt Kim
*Assistant Examiner* — Daniel Samwel
(74) *Attorney, Agent, or Firm* — Park, Vaughan, Fleming & Dowler LLP

(57) ABSTRACT

A user interface and methods are provided for presenting electronic content on a mobile device with a content-serving application. Heterogeneous content includes 'internal' and 'external' content. Internal content includes items served by a system hosting the application and/or other items to which the host has full access rights, while external content includes items to which the application host does not have full access rights (e.g., because they are served by a remote site). Placeholders representing content items are browsed using one input, and an item is opened by different input when its placeholder is displayed. External items may not be retrieved until they are opened. Gestures while an external item is open are communicated to its remote site, and when either type of item is fully panned left or right, the item begins to scroll out of view sideways and the placeholder of the next item scrolls into view.

18 Claims, 11 Drawing Sheets

User Interface 400

Ray Williams on LinkedIn
The End of Careers as we Know Them

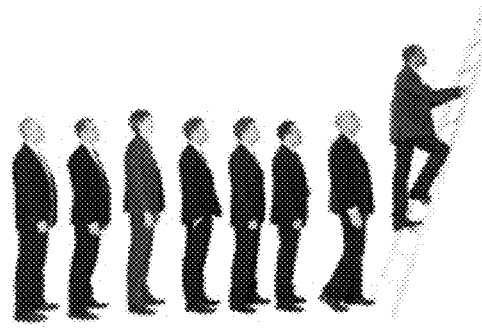

Technology, for the most part, has not allowed us to retire to a life of leisure as predicted decades ago. In my *Financial Post* article, "In the Future, No One is Going To Pay You Just to Show Up," The current reality is that we may see many people resigned to an extensive period of unemployment or

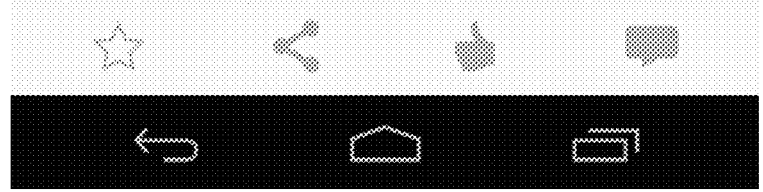

Content Item 404

FIG. 4C

Placeholder 422
(of External Item 424)

User Interface 400

Stripe Inks Deal With Alipay to Connect Chinese Shoppers With Western Brands

June 24, 2014, 9:00 AM PDT

By Jason Del Rey

↑
User
Gesture

Patrick and John Collison have long said the online world shouldn't be as segregated as the real one. They have Content Item 424

Content Item 424

User Interface 400

Content Item 424

User Gesture

USER INTERFACE FOR PRESENTING HETEROGENEOUS CONTENT

BACKGROUND

This disclosure relates to the fields of electronic devices and application software. More particularly, a user interface for presenting electronic content is provided for a mobile application.

Mobile computing and communications devices, while providing great convenience in terms of portability and flexibility, typically lack display screens comparable to stationary computers and workstations. Therefore, a user of a mobile device may be able to operate various applications while on the go, but the small display screen may detract from his or her enjoyment.

For example, an application (or app) designed to visually depict news stories, magazine articles, content from a professional network or a social network, electronic mail, and/or other types of content will be limited in how much it can display at a time and in how it can display that content. There are many content sources, with many different items to view, of varying sizes, which may or may not be configured for display on the limited area of a mobile device's display screen.

Many mobile applications offer users access to content hosted or offered by third parties (i.e., organizations other than the provider of the application). When a user selects (e.g., clicks on) such a content item, the application typically opens a view of a snippet of the item's content (e.g., text), which may be provided via an RSS (Really Simple Syndication or Rich Site Summary) feed for example, and which includes a link to the rest of the item (i.e., at the provider's site). The user must activate the link to cause the application to connect to the corresponding third-party site; that site then controls the user's navigation of the content. Thus, the user must activate a first control (e.g., by click or tap) to open the snippet, and the user's manipulation of the snippet (e.g., scroll up or down, pan left or right) is interpreted and applied by the application. Then the user must activate a second control (e.g., the link) to finally access the full content, at which time the user's manipulation of the content is controlled by the third-party site.

To return from the external site to view a different content item or to otherwise use the application requires the user to first return to the content snippet (e.g., by activating a "back" control), and then return from the snippet (e.g., by manipulating the "back" control again). The requirement to activate multiple controls to access a single content item, and again to return, can diminish a user's enjoyment of the application.

DESCRIPTION OF THE FIGURES

FIGS. 4A-H illustrate a user interface as provided herein, in accordance with some embodiments.

DETAILED DESCRIPTION

Figure 1:
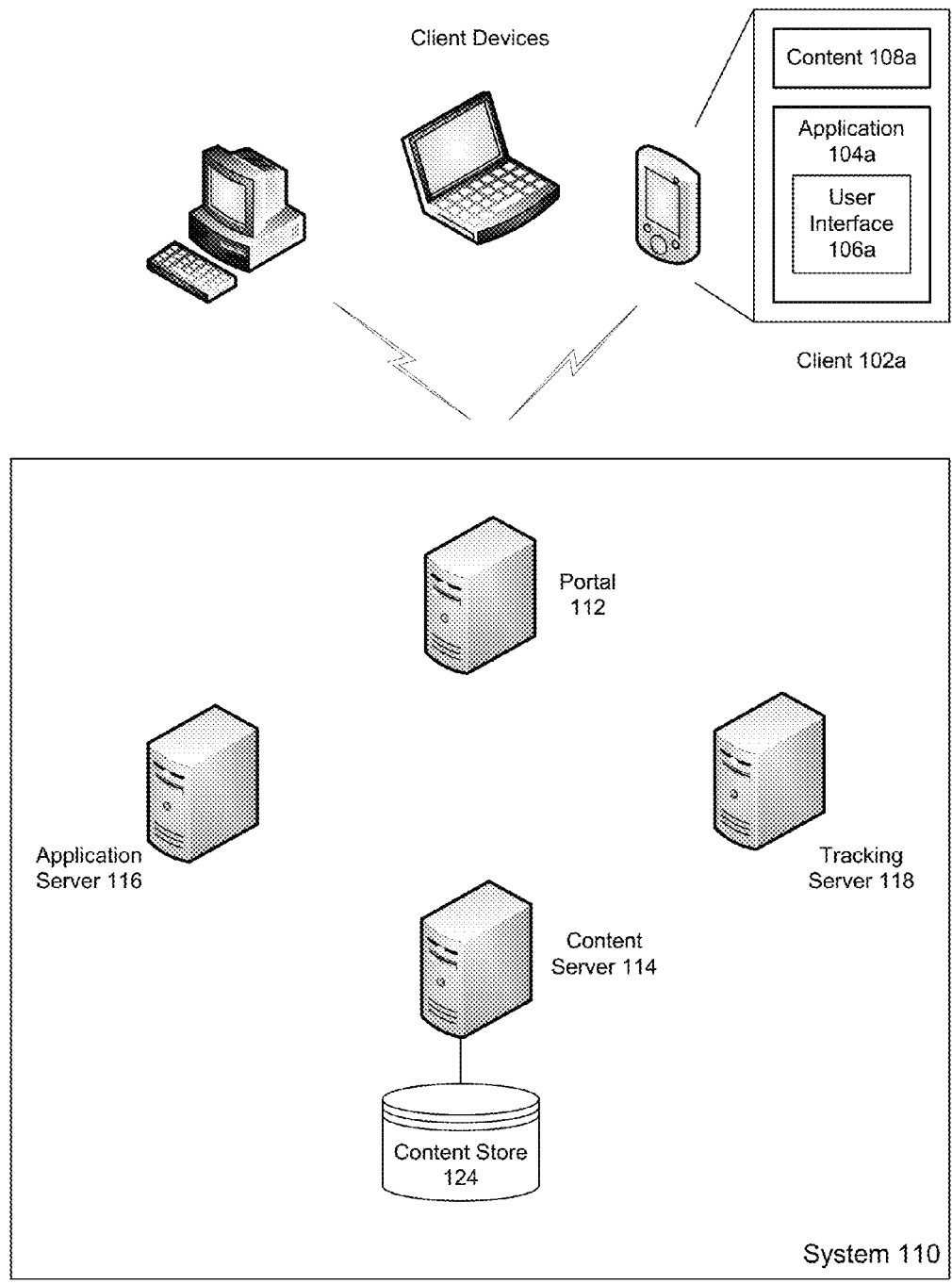
FIG. 1 is a block diagram of a computing environment hosting or supporting operation of a mobile application having a user interface provided herein, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, an invention or inventions associated with this disclosure are not intended to be limited to the embodiments shown, but rather are to be accorded the widest scope consistent with the disclosure.

In some embodiments, a user interface, apparatus, and methods are provided for controlling presentation of content within a software application, particularly an application executing on a mobile computing/communication device (e.g., a smart phone, a tablet computer). The content includes items such as news stories, blog entries, magazine articles, content provided by a professional or social network, various communications (e.g., instant messages, electronic mail messages, social network activities), and/or other types of items that include text, images, video, or other visual content.

These embodiments operate with heterogeneous content, meaning that content of two or more different categories are presented, which may be differentiated as internal and external. Internal content includes content that is maintained or stored by a host or provider of the application and any other content to which the host/provider/user has full access rights, while external content is content received from a source other than the host or provider of the application, and to which the host/provider/user does not have full access rights. Thus, the application can format and re-format internal content as and when desired, and fully control its presentation by interpreting and applying a user's input commands and gestures (e.g. taps, swipes, key presses) natively, within the application's user interface. Presentation or manipulation of external content may require coordination with the external source in order to interpret or translate a user's input into a correct display of the item. Therefore, a user's input while viewing a given content item may be interpreted and applied differently, depending on whether the item is 'internal' or 'external.'

Content may also or instead be differentiated based on domain. For example, content items maintained in and/or served from a domain in which the application is hosted, and possibly domains that the application hosts/providers/users of the application have full access to, may be considered internal items. Content items maintained in and/or served from other domains may be considered external items. Internal content may alternatively be characterized as 'local,' while external content may alternatively be characterized as 'remote.'

In some embodiments, all internal content is served from the domain of the system that hosts the application. In particular, although some content that may be deemed internal may originate outside that domain, because the system has full access to it, the system can receive or retrieve the content and format it natively before transmitting to a user's client device. Thus, in these embodiments, only external content is delivered to the user's device from a domain other than the application host system's domain.

As mentioned above, manipulation of an external item presented in the application's user interface on a device (e.g., to scroll the item's content) may require the input to be reported or transmitted to the remote site associated with the item (e.g., the system that maintains and/or serves the item), which will then inform the application how to change the view of the item, such as by identifying a current position within the item and indicating whether or not the user has reached an edge, margin, or other boundary of the item.

Regardless of the category of a particular content item (e.g., internal, external), a single click on or swipe into the item (or a representation of the item) will open it and allow the user to start viewing the content. If the item is internal, the application opens a native view of the content and may format it as the content source or provider intended; if the item is external, the application may quickly open a connection to the corresponding (third-party) site—even before the user opens the item—to enable the user to view the item in its home context or domain. Thus, content items from different categories are opened in the same manner via the user interface, and a user may access and consume both types of items with the same touch patterns (e.g., tapping, swiping) or input via physical controls (e.g., buttons, keys), without needing to or being able to differentiate between the different categories of content and without having to activate additional controls to access external content.

Embodiments are described herein as they may be implemented on a mobile electronic device having a touch-screen display that receives a user's gestures as input. Alternatively, some or all input may be made in the form of key presses, manipulation of a pointing device (e.g., a track pad or touch pad, a mouse), or some other physical control. Therefore, references to gestures on or touches of a touch-screen display should be understood to encompass equivalent input made via some other control means.

In some embodiments, the user interface offers a user a stream of content items drawn from any number of sources (e.g., internal, external), and the user manipulates the user interface in one manner, such as swiping the display screen within or along one direction or axis (e.g., a horizontal axis) in order to browse through the items. In this stream, each item is represented by a placeholder or card that includes an image that was extracted from the corresponding item or that was supplied by the provider of the content item to represent the item, an image of something associated with the content item, an image of the author, publisher, or source, or some other graphic (e.g., a logo). Other information may be embedded within or overlaid upon the image, such as a title of the content item, a byline, an indication of a type or category of content, a reason for offering the item to the user, etc.

In some embodiments, as the user swipes the display screen in the appropriate direction or along the appropriate axis, the placeholder associated with the next item slides smoothly into view. Thus, when browsing the content stream from one item to the next, portions of both items' placeholders may temporarily be viewable. If the user releases his finger (or other implement used for swiping, such as a stylus), one of the placeholders will fall into place and occupy all (or substantially all) of the display screen.

In some embodiments, while a user is browsing content placeholders, the application may change the focus to the next placeholder as soon as the user swipes it past some threshold percentage of the width (or other dimension) of the display screen. This threshold may vary from one implementation to another, and may be less than 50% of the screen width in some cases, and may be 50% or more in some other cases.

When the user manipulates the user interface in another direction (e.g., vertically), which may be orthogonal to the direction in which the interface is manipulated to scroll or browse through the content items' placeholders, the text and/or other content of the item whose placeholder is currently displayed begins to scroll into view. Continuing to manipulate the interface in the same direction will cause the content to continue to scroll. As indicated above, opening the content item in this manner may entail opening a native view of internal content, or opening a connection to a provider of external content without first opening a snippet and requiring further user action in order to access the full or main portion of the content.

In some implementations, the initial scrolling of an item's contents occurs while the user's digit (or other implement, such as a stylus) contacts a portion of the display screen that displays the item's placeholder, and, as the digit is swiped in the appropriate direction, the image is overlaid with the content, but the digit does not obscure the content. For example, if the scrolling direction is upward, when the user's digit begins swiping in that direction, the (textual) content begins to appear some distance below his or her finger, instead of being directly under (and being obscured by) the digit. Thus, the content slides upward over the image as the user swipes and the user can reverse this action to close the item if desired (e.g., if an initial portion of the item satisfies or quenches his curiosity). When the content fills the display screen, of course, the user must re-position his or her digit and continue swiping in order to continue scrolling the content.

After the user has scrolled through the item by swiping in the same direction, if he swipes in the opposite direction the content will scroll in that direction and, if he scrolls far enough to return to the beginning of the content, and continues swiping, the content will scroll off the display screen and the placeholder will return to the foreground.

In some embodiments, internal content items are downloaded or streamed to a user's device any time after the user opens the application and content relevant to (e.g., likely to be of interest to) the user is identified, which may be before he or she starts browsing the offered content, when he or she stops browsing and "swipes into" an item to open it, and/or while viewing some other item. External content items may be identified at the same time and/or in the same manner as internal content, but may not be retrieved from their external sources until the user pauses or stops at an external item's placeholder and/or swipes into it.

In other words, as a user browses a stream of placeholders representing offered or suggested content items (e.g., by swiping horizontally), including internal and/or external items, individual internal items may have already been downloaded to the user's device, may be downloaded as she continues to browse, or may be downloaded when she pauses at or opens one. However, in these embodiments, an external content item is not retrieved until she stops browsing placeholders, at which point the image corresponding to an external item is displayed on her device's display screen, and possibly not until she begins swiping into the item to open it.

In other embodiments, however, some external content items may be downloaded to a user's device before the user opens them. For example, if the item placeholders representing the (external) content items are arranged in a priority order such that the items deemed most relevant and/or most likely to be of interest to the user are offered first, the N highest priority (external) content items (N≥1) may be downloaded before the user ever attempts to open them. More items may be downloaded as and when communication bandwidth becomes available. Or, if the user browses placeholders of external content at some relatively slow pace, the application may initiate a connection to retrieve the content when, or before, the user stops at a placeholder.

While the application is connected to an external site and retrieving content, or is attempting to establish such a connection, that connection may be automatically dropped or terminated if the user browses past the content item's placeholder.

After an internal content item is opened by swiping into it, swiping in the same direction that allowed a user to browse among items' placeholders will move the current item aside and replace it with the next item's placeholder. Because the application was able to fully control the formatting and presentation of the item, the application formatted or reformatted the item's contents as necessary to fully occupy the display screen, was able to decorate the content as desired (to insert/enable links to associated content), and so on. Also, the user's gestures and/or other command inputs can be interpreted and applied directly by the application.

In contrast, when a portion of an external content item is displayed, swiping in the same direction may have to be interpreted by the external site that hosts the content item, at least until reaching a side edge of the content item (e.g., the left or right margin of a textual item), at which point the user interface will start transitioning between items by moving the current item aside and moving the next item's placeholder into view if swiping continues in the same direction.

Illustratively, and assuming that horizontal swiping is the method of moving between content items and/or their placeholders, if a user zooms into an external content item (e.g., to increase font size, to obtain a larger view of an embedded image), swiping sideways may then cause the current item to pan sideways to show a portion of the external item that could not fit on the display screen.

In particular, the user's input (e.g., the direction and degree of swiping) is transmitted to the external site to allow it to determine and identify the portion of the item that should now be displayed. Until the site indicates that the user has reached an edge of the item, the item continues to pan sideways (at the same zoom level) as the user swipes in that direction. Once the site reports that an edge (a side edge) has been encountered, continued movement in the same direction will cause the user interface to begin transitioning to the next item (or the next item's placeholder). Thus, the user's gestures/input are relayed to the external or remote host of the content until that host indicates that an edge of the item has been encountered, after which further gestures/input in the same direction will be interpreted by the application as a desire to transition to the next item.

After a user swipes away from a content item while it is open, if he or she navigates back to the same item, it may be displayed in the same state the user left it in, meaning that the same portion may be displayed (and with the same level of zoom, if any).

Thus, in some embodiments, a user may swipe in or along two primary axes of movement to manipulate content items offered in the user interface—one (e.g., horizontal) to browse among available (or suggested) content items (and pan within an item if its full width cannot be displayed), and one (e.g., vertical) to scroll through an item. Because multiple categories of content are presented together (internal and external), interpreting and applying a gesture may or may not depend on coordination with a remote system.

FIG. 1 is a block diagram of a computing environment supporting operation of a mobile application having a user interface described herein, according to some embodiments. In these embodiments, system 110 is (or is part of) a system that hosts a professional or social networking service or system that helps members create, develop, and maintain professional (and personal) relationships, as provided by LinkedIn® Corporation, for example, and the application is designed to offer content generated within such a service or system, and possibly content from other sources as well. In other embodiments, the application that features a user interface provided herein is of some other type.

Members or users of a service or application hosted by system 110 connect to the system via client devices, which may be stationary (e.g., desktop computer, workstation) or mobile (e.g., smart phone, tablet computer, laptop computer). The client devices operate suitable client applications for accessing applications/services offered by system 110, such as a browser.

Some or all users of mobile devices that access system 110 also operate an application provided and/or hosted by system 110 specifically for accessing visual content (e.g., stories, articles, messages) of multiple sources. For example, client device 102a includes application 104a, which includes user interface 106a; some embodiments or aspects of user interface 106a are described herein. Device 102a also includes a repository of content 108a for display via the user interface, and may include other relevant components not depicted in FIG. 1, such as a transceiver, antenna, touch-screen display, input controls, a battery, storage component(s) (e.g., memory, solid-state drive), etc. Content 108a includes content items offered for presentation on device 102a, and may include internal and/or external items, and placeholders of some or all items currently stored on the device. Application 106a also includes logic for performing other functions identified herein, such as identifying the source of a content item (e.g., especially for external items), establishing communication connections with sources of external content items (directly or via system 110), rendering/displaying content items, interpreting a user's input, etc.

Internal content items served by system 110 to its users may include status updates, messages, advertisements, offers, announcements, job listings, news stories, magazine articles, blog entries, and so on, and may be or may include any type of media (e.g., text, images, video, audio). Internal content items may be created or generated by the system, by users of the system's applications and services, and/or by third parties who make their content available to users of system 110.

Users of system 110 may be termed members because they may be required to register with the system in order to fully access the available services. Members may be identified and differentiated by username, electronic mail address, telephone number, and/or some other unique identifier.

Interactive user sessions are generally made through portal 112, which may comprise a web server, a communication server, and/or some other gateway or entry point. The portal through which a given user session is established may depend on the user's device or method of connection. For example, connections from mobile client devices may be received via portals different from those that receive connections from traditional or stationary devices. System 110 also includes content server 114, application server 116, tracking server 118, and content store 124.

Content server 114 maintains one or more repositories of internal content items for serving to members (e.g., content store 124), an index of the content items, and/or other information useful in serving content to members. Illustratively, content server 114 may serve on the order of hundreds of millions of content items every day, for each of which the system may store an event record (in addition to data reflecting other user activity).

For example, tracking server 118 may track users' activities within the system, interactions with content delivered to them, and so on. Tracking server 118 may therefore record not only which content has been served to whom, and when, but also what (if anything) the users did with the content (e.g., clicked on a link to a related stored, opened an offer from an advertiser).

As indicated above, content store 124 may include various types of content and content items, including status updates, information released by members and possibly non-members (e.g., announcements, messages, comments, endorsements, shares), documents, advertisements (e.g., revenue and/or non-revenue ads), job listings, media (e.g., images, video, audio), news stories, blog entries, and so on, for serving to members and/or for use by various components of system 110. Content server 114 (or some other component of system 110) may include a recommendation module for recommending content to serve to a member.

In some embodiments, content server 114 and content store 124 constantly or regularly receive new content, particularly content generated by users of the applications/services of system 110 and content supplied by other systems, applications, and/or services that make content available to members of system 110. Also, however, via RSS feeds and/or other channels, system 110 receives placeholders and/or snippets of external content items.

For example, an external source of news stories may regularly publish information via an RSS feed, and system 110 may extract entire placeholders from a feed, may generate placeholders from the received information, or may assemble part of a placeholder from information it receives and query the provider for the rest of the placeholder (e.g., an image).

Members of a service hosted by system 110 have corresponding pages (e.g., web pages, content pages) on the system, which they may use to facilitate their activities with the system and with each other. These pages (or information provided to members via these pages) are available to some or all other members to visit in order to browse messages, announcements, and/or other information provided by or associated with the corresponding member. Members' pages may be stored on a component of system 110 depicted in FIG. 1, or on a component not shown in the figure. Member pages, portions of member pages, and/or links to member pages may be included in the content presented to a user via user interface 106a of application 104a.

System 110 may include other components not illustrated in FIG. 1. For example, in some embodiments system 110 includes a profile server to maintain profiles, in a profile database, of members of the service(s) hosted by system 110. An individual member's profile may reflect any number of attributes or characteristics of the member, including personal (e.g., gender, age or age range, interests, hobbies, member ID), professional (e.g., employment status, job title, functional area or industry, employer, skills, endorsements, professional awards), social (e.g., organizations the user is a member of, geographic area of residence, friends), educational (e.g., degree(s), university attended, other training), etc. A member's profile, or attributes or dimensions of a member's profile, may be used in various ways by system components (e.g., to identify who sent a message, to identify a recipient of a status update, to record a content-delivery event, to identify relevant or suggested content, to augment content presented via user interface 106a).

Organizations may also be members of the service (i.e., in addition to individuals), and may have associated descriptions or profiles comprising attributes such as industry (e.g., information technology, manufacturing, finance), size, location, goal, etc. An "organization" may be a company, a corporation, a partnership, a firm, a government agency or entity, a not-for-profit entity, an online community (e.g., a user group), or some other entity formed for virtually any purpose (e.g., professional, social, educational).

The functionality of system 110 may be distributed among the illustrated components in an alternative manner, such as by merging or further dividing functions of one or more components, or may be distributed among a different collection of components. Yet further, while depicted as separate and individual hardware components (e.g., computer servers) in FIG. 1, one or more of portal 112, content server 114, application server 116, and tracking server 118 may alternatively be implemented as separate software modules executing on one or more computer servers. Although only a single instance of a particular component of system 110 may be illustrated in FIG. 1, it should be understood that multiple instances of some or all components may be utilized.

FIGS. 4A-H illustrate a user interface as provided herein, according to some embodiments.

Figure 4A:
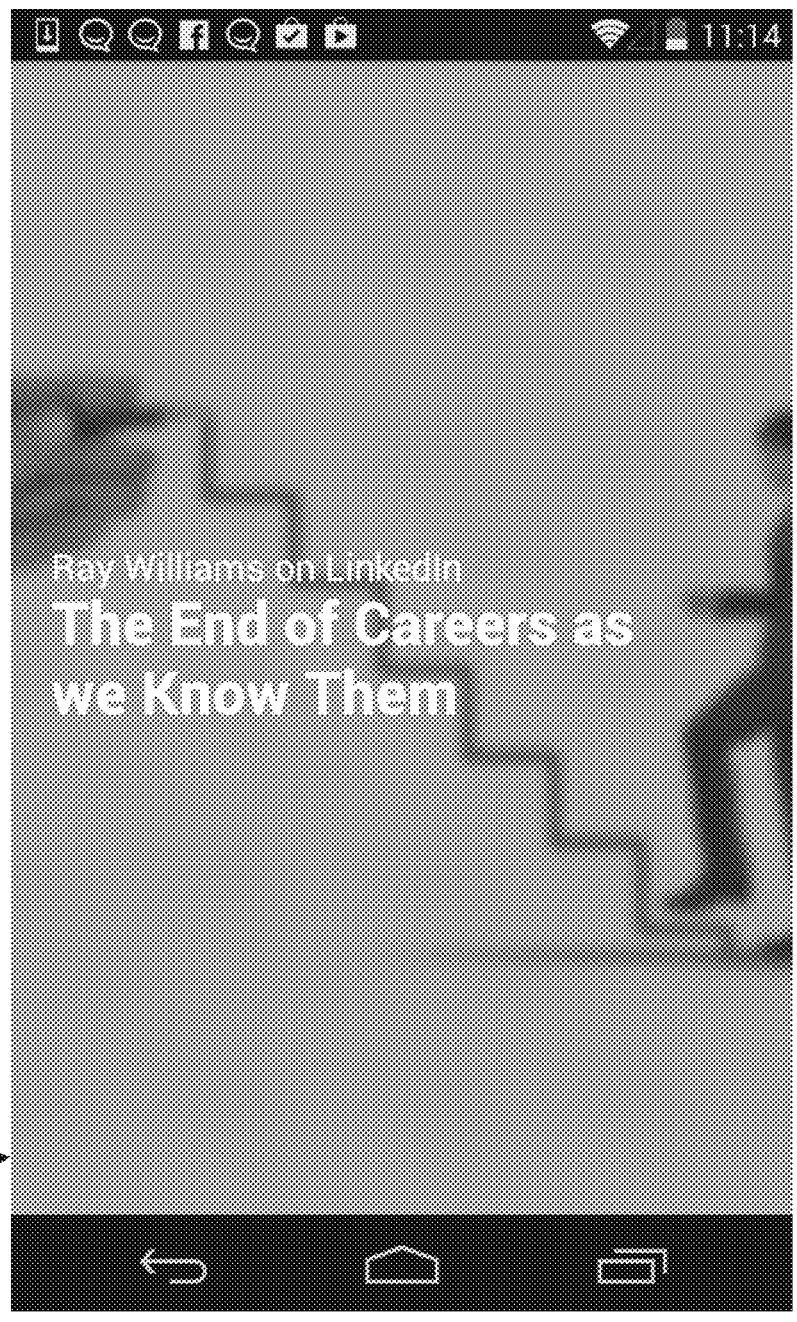

FIG. 4A depicts user interface 400 with placeholder 402 of an internal content item 404 displayed. As described previously, a user of the device that incorporates user interface 400 may have browsed through one or more other placeholders until stopping at placeholder 402, or it may be the first one displayed after the user activates the application that includes user interface 400.

Figure 4B:
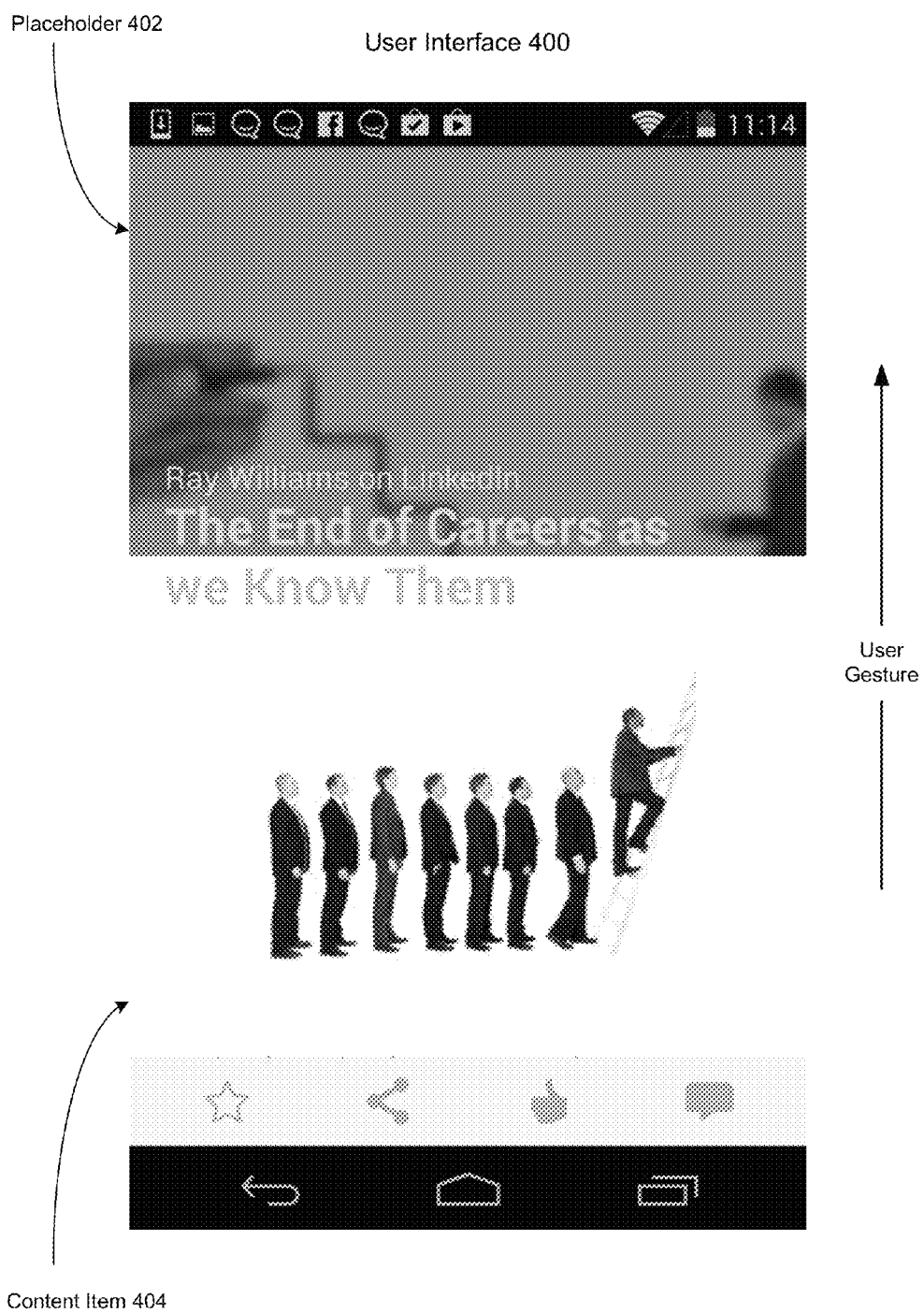

FIG. 4B depicts user interface 400 as the user gestures upward (e.g., with his or her digit or some other tool). Placeholder 402 remains substantially in place, but is overlaid with the content of internal content item 402.

FIG. 4C depicts user interface 400 after the content of item 404 has completely overlaid placeholder 402. Because the item is an internal content item, it is displayed in a native mode, in which the left and right margins of the content are aligned with the edges of the displayable portion of the device's display screen, the font and font size are appropriate for easy reading (and may be based on readability settings selected by the user), and/or other adjustments have been made and/or can be made dynamically by the application in order to present the content in a pleasing format.

Figure 4D:
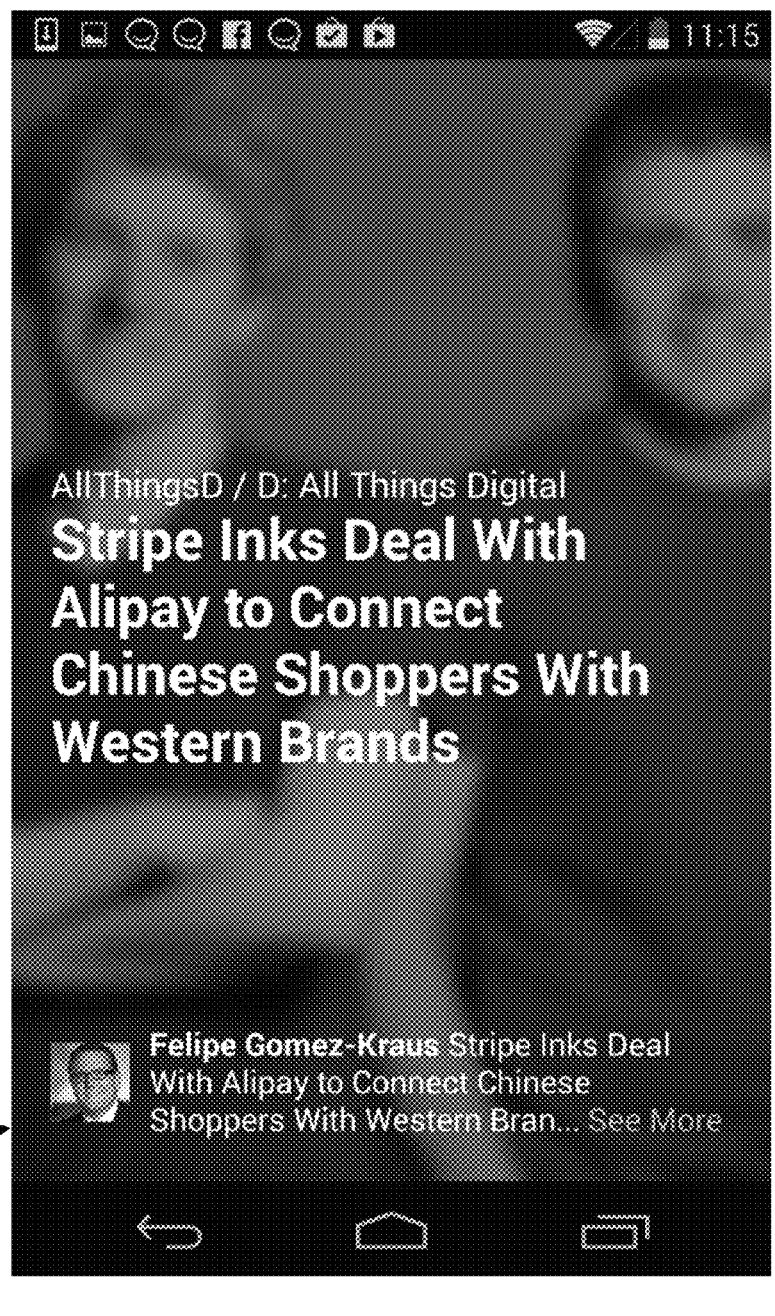
Figure 4E:
Figure 4E:
Figure 4E:
Figure 4E:
Figure 4E:
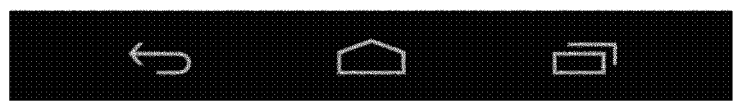

FIG. 4D depicts user interface 400 as it displays placeholder 422 of an external content item 424, and FIG. 4E shows the external content item after it has been swiped upward to overlay or replace the placeholder.

Figure 4F:
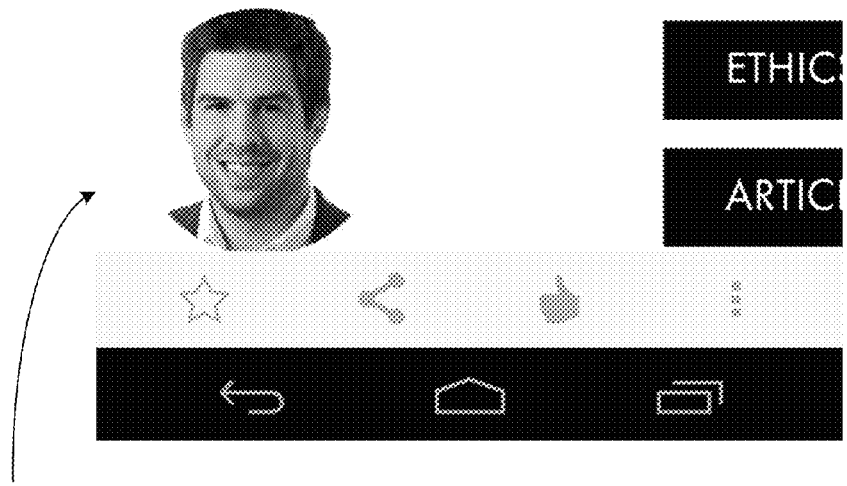

FIG. 4F shows user interface 400 as it may display content item 424 in some circumstances. In particular, the view is 'zoomed-in' because the user pinched or reverse-pinched the screen to open a magnified view (or used some other control means to magnify the view), because the content item was not formatted appropriately for the device on which it is being displayed, or for some other reason.

Figure 4G:
Figure 4G:
Figure 4G:
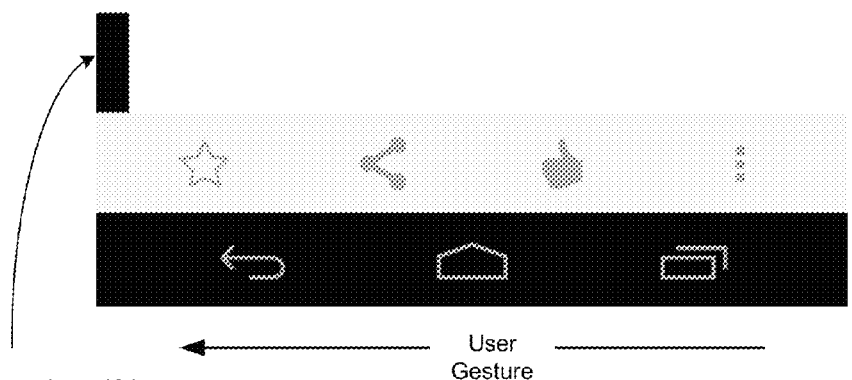

In FIG. 4G, the user has swiped or otherwise entered input to pan the view of content item 424 sideways. To update the view correctly, the user's input was relayed to the site that provided the content item, and that site indicated how the item should now be displayed (e.g., which portion of the item should be displayed). Also, the user has panned to a side margin of the content item, and so the external site will also indicate to the application that the right-hand edge of the document has been encountered.

Figure 4H:

FIG. 4H depicts user interface 400 as the user continues to gesture in the same direction. As shown, content item 424 moves sideways as placeholder 442 of a next content item moves into view. This transition may occur regardless of the type of content (internal, external) of the two content items.

Figure 2:
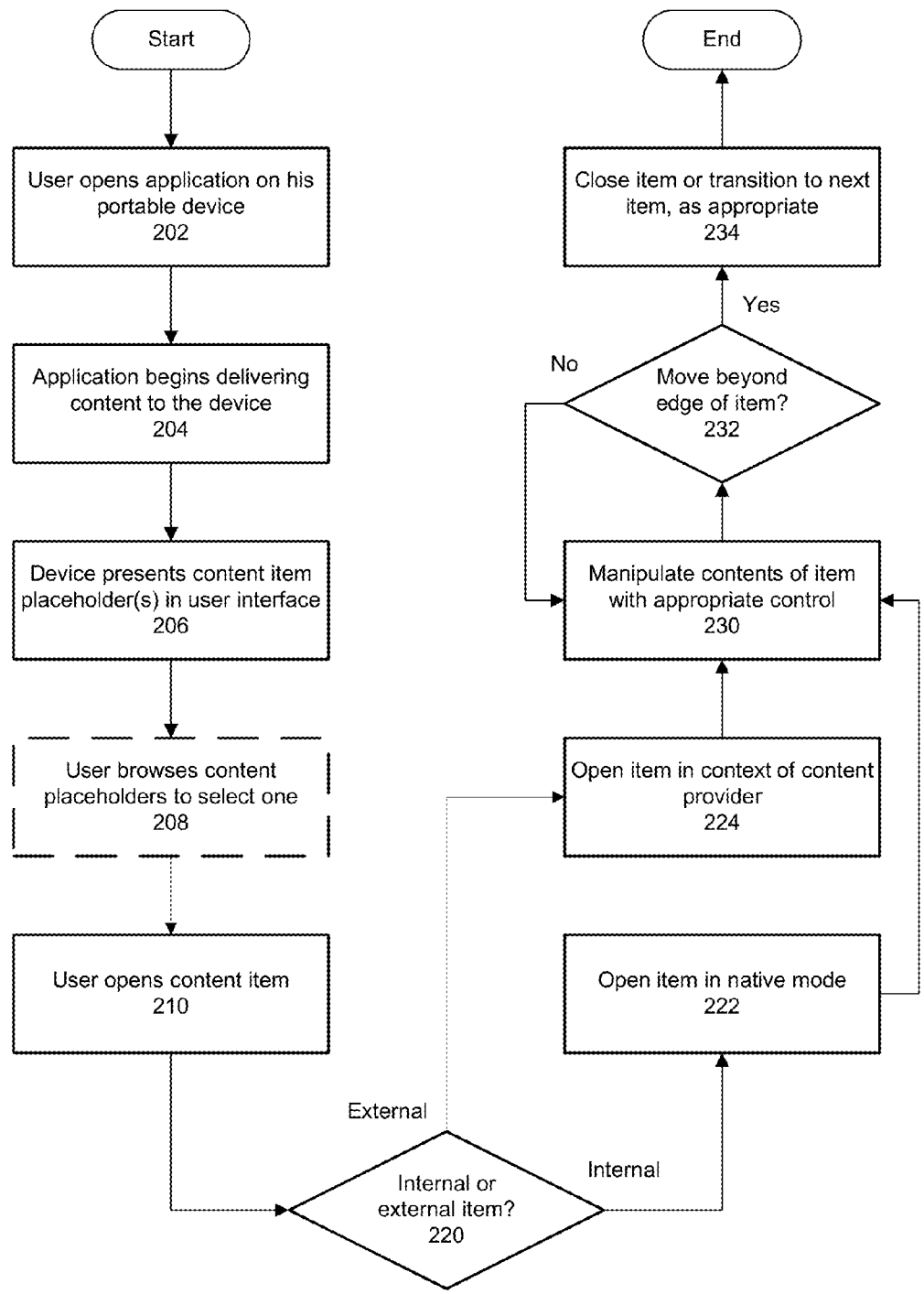
FIG. 2 is a flow chart demonstrating a method of presenting heterogeneous content to a user via a user interface of an application operating on a mobile device, in accordance with some embodiments.

FIG. 2 is a flow chart demonstrating a method of presenting heterogeneous content to a user via a user interface of an application operating on a mobile device, according to some embodiments.

In these embodiments, the application provides access to two types of content—internal content that the application or an application client can format and/or manipulate as necessary, and external content that requires an application client to connect to an external site in order to display the content. Individual items of internal content may be managed by the organization that hosts or provides the application, or may be managed by a third party that allows the organization to control presentation of the content. Items of external content are managed by external entities (e.g., content publishers, content channels), and so their presentation may involve cooperation with those entities by opening appropriate connections to view the items in the external entities' domains or contexts (e.g., via HTTP or HyperText Transport Protocol).

Prior to and during execution of this process, the organization that hosts or supports the application (e.g., system 110 of FIG. 1) regularly receives new internal content and/or notifications of external content. Internal content may be proactively formatted or configured for serving to application clients before it is served (e.g., upon receipt from its source), or only when it is served.

In operation 202, a user of the application opens the application (e.g., a client portion of the application) on his portable or mobile communications/computing device (e.g., a smart phone, a tablet computer), and the application establishes a communication connection with the application host system, such as system 110 of FIG. 1.

The application host system identifies content items that may be of interest to the user. In different embodiments, the items may be selected with or without specific hints by the user. For example, the user may identify (or may have identified) particular content sources, content publishers, content channels, and/or general types of content that he enjoys (e.g., news stories, professional/social network updates from his friends, sports scores). Or, the system may identify suitable content items based on what the user has viewed previously, other behavior of the user with another application or service provided by the host system (e.g., a professional or social network), and/or other factors.

In operation 204, the application host system begins delivering content items and/or placeholders for items. In some implementations, for some content items (e.g., items deemed to most likely be of interest to the user, internal content items), the system may download entire items (as well as their placeholders), especially items to be offered first because they are most relevant to the user and/or his interests, before or while the user browses placeholders representing content items being offered to him. For other items (e.g., low-priority or low-relevance items, external items), the system may download just the placeholder, and refrain from downloading the item's contents until the user actually opens the item or pauses at its placeholder.

In some implementations, the application client software periodically requests additional placeholders and/or content while the application is executing on the device. For example, when the application is first opened it may immediately solicit the first X items or the first X placeholders (X≥1). When the user browses through all of them (or almost all of them), the application may request more (e.g., another X items or placeholders). This may continue as long as the user is operating the application and as long as the application host system has more content to offer.

In operation 206, on the user's device the application's user interface presents a placeholder of a first content item. As described previously, the image that represents and/or was extracted from the content item may cover most of or all of the display screen, or at least most of or all of the area of the display screen occupied by the application. Any other information regarding the item may be overlaid upon the image. Thus, the user may also see a title of a textual item, a source (e.g., publisher, author, creator), and so on.

In some implementations, a placeholder may reveal a reason why the corresponding content item was offered to the user. For example, the reason may indicate that a friend or associate of the user created the item or took some action regarding it (e.g., shared it, liked it, commented on it), that it concerns a subject or theme the user expressed an interest in, that it is from a content source the user follows or subscribes to, that it is recommended reading for people having some attribute or characteristic shared by the user (e.g., industry, job, university attended), etc.

In optional operation 208, the user browses through any number of content items. In the illustrated method, the user swipes the user interface of the application horizontally to browse items' placeholders. For example, swiping his finger (or other controlling implement) to the left may allow the user to view the placeholders of content items higher in priority or relevance, while swiping to the right may allow him to access items that have lower priority or relevance (e.g., if items are offered in order of their priority and/or relevance). In some implementations, this virtual horizontal queue is circular, in which case the queue may have no end.

In operation 210, the user opens a selected content item whose placeholder is currently displayed in the user interface; this item may be deemed the "current" item because it is currently the focus of the user's attention in the user interface. Illustratively, opening the item involves swiping it upward in the user interface, tapping on it once or twice, shaking the device, or taking some other specific action. The appearance of a placeholder may change after the user opens or entirely views its contents.

In operation 220 the application identifies a source or context of the selected item if necessary. In particular, the application may determine whether the item is an internal content item or an external content item. In some implementations, the client application software includes delegate logic or a delegate module that knows which category (internal or external) a given item belongs to. If the item is internal, the method continues at operation 222; otherwise, the method advances to operation 224.

In some implementations, internal content items are fully downloaded before a user ever attempts to open one. In these implementations, operation 220 may involve determining whether the item's contents are available. If not, then the item is an external item.

In operation 222, the application opens the selected item in a native view or mode, wherein the application (e.g., the application's user interface logic) receives the user's gestures and/or other inputs and translates those inputs to affect how the item is presented and how the user interface changes. In particular, and as described below, in this native mode the user interface presents the item as the application specifies it is to be displayed, without requiring any coordination with a remote entity. After operation 222, the method advances to operation 230.

In operation 224, the selected item is an external content item, and so the application establishes a communication connection with the provider of the item (e.g., an HTTP session), and opens and displays the item within the domain or context of that provider. The provider may transmit the item's contents to the application client and specify which portion of the item to display, how to display or render it (e.g., fonts, highlighting), etc.

In some embodiments, a content item may be downloaded, or start to download, as soon as the item's placeholder occupies the user interface of the application. For example, while the user is browsing through items' placeholders, the application may refrain from downloading any (external) content items. But, as soon as the user stops or pauses browsing, and one (external) item's placeholder is displayed, the application may connect to the corresponding external content provider and start downloading the item's content before the user actually swipes into the content.

In operation 230, if and when the user enters a physical gesture (e.g., a swipe, a tap) or other input (e.g., to zoom in or out), display of the item in the user interface changes as specified by the entity having control—either the application in its native mode (for an internal item) or the application in combination with the external source (for an external item).

Thus, for an internal item the application may determine which portion of the item to display as the user scrolls through it, zooms and/or out, pans, changes a resolution, clicks a link or other object within the item, or takes any other action that affects how the item is displayed. If an internal content item includes a link to other content, such as a web page that can be deemed internal, that other content will open within the view of the internal content item if the user activates the link.

For an external item, as the user swipes through the item, pans, zooms, clicks on an area (e.g., a link), or takes other action, the application transmits the action and context to the external provider, and that provider indicates how to change or update the display. Thus, some or all user gestures that affect the view of the item are sent to the external provider for interpretation.

For example, within the external content item, the user may touch an image and swipe, which the external site may translate into a movement (e.g., dragging) of the image, rather than scrolling or panning of the content item.

If the content was not optimized for a mobile platform such as the user's electronic device, it may have opened with a zoomed view into a portion of the content, in which case the provider will indicate how to update the user's view when he enters a gesture or other input. This may be differentiated from internal content items, for example, which may open with a view in which the item is formatted so that the left and right edges of the content match the left and right edges of the display area, and with an appropriate font size.

In operation 232, the application determines whether the user has moved to an end or edge of the item's contents. This determination may be aided by a signal from the provider of an external content item, which may, for example, specify that the user has scrolled to the bottom, has scrolled to the right edge while zoomed in, etc. Until the user scrolls to an edge (e.g., top, bottom, left, right), he may continue to manipulate the item within the user interface.

More specifically, as the user manipulates a view of an external content item, data representing the user's gestures (e.g., scrolling, zooming) are sent to the provider. Then, along with information indicating how to update the display the provider identifies what part of the content item is currently displayed. Thus, it may indicate that the user has reached the top, bottom, or a side edge of the item. For internal content items, the application has full knowledge of the state of the item and can readily determine whether an edge has been encountered.

In operation 234, the application determines how to respond to the user's movement to the edge of the item.

Illustratively, the user may swipe, scroll, or pan in the reverse direction away from the edge, in which case the application will return to operation 230 to allow continued manipulation of the item.

However, if the user scrolls back to the beginning of the document, by swiping downward, and keeps swiping, the content item scrolls back out of view and the user interface transitions back to a display of the item's placeholder—thereby reversing the action taken when the user swiped into the item.

If the user pans to the left edge or right edge of the document, and continues swiping in the same direction, the user interface will begin transitioning to the next content item by sliding the current content item in the direction of the swiping and bringing into view the placeholder of the next content item in sequence. If this next content item was previously viewed during the current application session, but was left open (e.g., because the user swiped away from it), the view of the item may be of the portion of the item that was presented when it was left open, instead of the placeholder.

In the illustrated embodiment, if the user scrolls to the bottom of the item, no action is taken other than to stop scrolling the contents of the item. Alternatively, scrolling to the bottom and beyond of an item may cause some other action (e.g., open a control panel of the application, access controls for navigating through previously viewed content and/or finding desired or interesting content).

Figure 3:
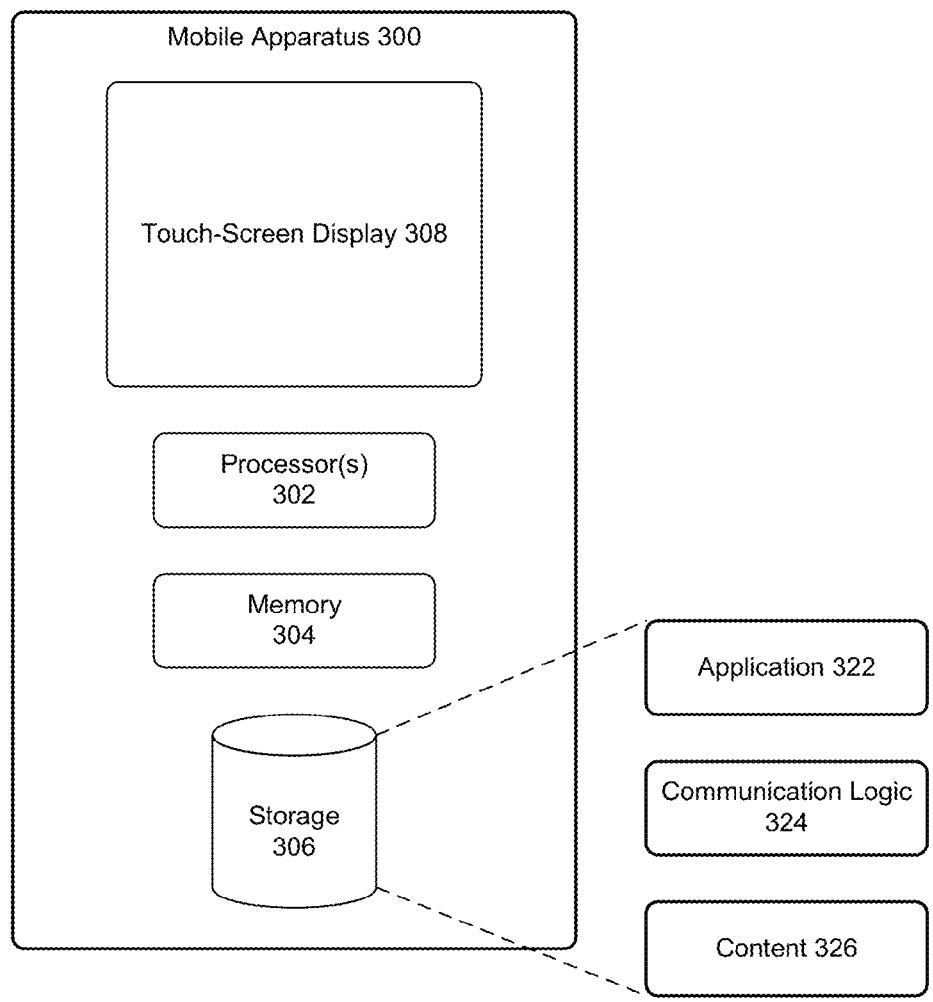
FIG. 3 is a block diagram of an apparatus for presenting heterogeneous content, in accordance with some embodiments.

FIG. 3 is a block diagram of an apparatus for presenting heterogeneous content via a user interface of an application, according to some embodiments.

Mobile apparatus 300 of FIG. 3 comprises touch-screen 308, processor(s) 302, memory 304, and storage 306, which may comprise one or more optical, solid-state, and/or magnetic storage components. Mobile apparatus 300 also includes other components not depicted in FIG. 3, such as an antenna, baseband processor, transceiver, battery, one or more physical controls, etc.

Storage 306 stores logic that may be loaded into memory 304 for execution by processor(s) 302. Such logic includes application 322 and communication logic 324. In other embodiments, these logic modules and/or other content may be combined or divided to aggregate or separate their functionality as desired.

Application 322 comprises processor-executable instructions for presenting heterogeneous content to a user of apparatus 300, via touch-screen display 308. Application 322 cooperates with an application server of a system that hosts the application and that provides to apparatus 300 at least some of the content presented via application 322. Application 322 includes user interface logic that presents content items and their placeholders, and that enables a user to open and view content items, browse placeholders, and/or take other action as described herein.

Communication logic 324 comprises processor-executable instructions for communicating with sources of internal content items (including the system that hosts application 322) and external content items, as well as other entities.

Storage 306 also stores content 326, which includes internal and external content items delivered to apparatus 300 for presentation via the user interface of application 322, and placeholders for the content items. As described above, placeholders may be regularly downloaded to the apparatus, to allow a user to continually browse for interesting content. Individual content items may be downloaded preemptively (i.e., before the user selects or opens their placeholders), may be downloaded as the user is browsing placeholders, or may not be downloaded until the user selects and/or opens a corresponding placeholder.

An environment in which one or more embodiments described above are executed may incorporate a general-purpose computer or a special-purpose device such as a handheld computer or communication device. Some details of such devices (e.g., processor, memory, data storage, display) are omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of operating a mobile electronic device, the method comprising:
   executing an application for displaying internal content and external content on a mobile electronic device operated by a user, wherein internal content is served from a host network domain of a host system of the application and external content is served from one or more external network domains other than the host network domain;
   displaying on the device a portion of a first content item in response to a first user input;
   determining whether the first content item is internal content or external content;
   while the portion of the first content item is displayed, receiving a second user input having different significance depending on whether the first content item is internal content or external content;
   when the first content item is internal content, applying the second user input to transition the display of the portion of the first content item to a display of a portion of a second content item; and
   when the first content item is external content:
   determining whether a side edge of the first content item is displayed, by:
   communicating the second input to the external domain that served the first content item; and
   receiving from the external domain an interpretation of the second input, the interpretation comprising one of:
   information identifying a second portion of the first content item; and
   an indication that the user has navigated to a side edge of the first content item; and
   applying the second user input to update the display as directed by the external domain that served the first content item.

2. The method of claim 1, further comprising, prior to applying the second user input:
   determining whether the user is navigating beyond a side edge of the first content item.

3. The method of claim 2, wherein determining whether the user is navigating beyond a side edge comprises:
   determining that a side edge of the first content item is displayed; and
   determining whether the second user input continues after the side edge is displayed.

4. The method of claim 1, wherein:
   the first input and second input are gestures on a touchscreen display of the electronic device;
   the first input is a swipe gesture in a first axis of motion; and
   the second input is a swipe gesture in a second axis of motion.

5. The method of claim 1, further comprising, prior to displaying the first content item:
   repeatedly receiving the second user input; and
   during the repeated receipt of the second user input, displaying a sequence of placeholders representing content items;
   wherein displaying a first content item in response to a first user input comprises:
   upon cessation of the repeated second user inputs, displaying a first placeholder representing the first content item; and
   receiving the first user input while the first placeholder is displayed.

6. The method of claim 5, wherein during the display of the sequence of placeholders, the second user input has only one significance, regardless of whether the content items represented by the placeholders are internal content or external content.

7. The method of claim 5, wherein a given placeholder representing a given content item comprises:
   an image associated with the given content item;
   an identifier of a source of the given content item; and
   an indication of a reason the given placeholder is displayed for the user.

8. The method of claim 5, wherein:
   a content item that is internal content is received at the electronic device prior to display of a placeholder representing the internal content item; and
   a content item that is external content is received at the electronic device only after a placeholder representing the external content item is displayed.

9. A mobile apparatus, comprising:
   one or more processors; and memory storing instructions that, when executed by the one or more processors, cause the apparatus to:

execute an application for displaying internal content and external content on a mobile electronic device operated by a user, wherein internal content is served from a host network domain of a host system of the application and external content is served from one or more external network domains other than the host network domain;

display on the device a portion of a first content item in response to a first user input;

determine whether the first content item is internal content or external content;

while the portion of the first content item is displayed, receive a second user input having different significance depending on whether the first content item is internal content or external content;

when the first content item is internal content, apply the second user input to transition the display of the portion of the first content item to a display of a portion of a second content item; and when the first content item is external content:

determine whether a side edge of the first content item is displayed, by:

communicating the second input to the external domain that served the first content item; and receiving from the external domain an interpretation of the second input, the interpretation comprising one of:

information identifying a second portion of the first content item; and an indication that the user has navigated to a side edge of the first content item; and apply the second user input to update the display as directed by the external domain that served the first content item.

10. The apparatus of claim 9, wherein the memory further stores instructions that, when executed by the one or more processors, cause the apparatus to, prior to applying the second user input:

determine whether the user is navigating beyond a side edge of the first content item.

11. The apparatus of claim 10, wherein determining whether the user is navigating beyond a side edge comprises:

determining that a side edge of the first content item is displayed; and determining whether the second user input continues after the side edge is displayed.

12. The apparatus of claim 9, wherein:

the apparatus comprises a touch-screen display; and the first input is a swipe gesture on the touch-screen display in a first axis of motion; and the second input is a swipe gesture on the touch-screen display in a second axis of motion.

13. The apparatus of claim 9, wherein the memory further stores instructions that, when executed by the one or more processors, cause the apparatus to, prior to displaying the first content item:

repeatedly receive the second user input; and during the repeated receipt of the second user input, display a sequence of placeholders representing content items;

wherein displaying a first content item in response to a first user input comprises:

upon cessation of the repeated second user inputs, displaying a first placeholder representing the first content item; and receiving the first user input while the first placeholder is displayed.

14. The apparatus of claim 13, wherein during the display of the sequence of placeholders, the second user input has only one significance, regardless of whether the content items represented by the placeholders are internal content or external content.

15. The apparatus of claim 13, wherein a given placeholder representing a given content item comprises:

an image associated with the given content item;

an identifier of a source of the given content item; and an indication of a reason the given placeholder is displayed for the user.

16. The apparatus of claim 13, wherein:

a content item that is internal content is received at the electronic device prior to display of a placeholder representing the internal content item; and a content item that is external content is received at the electronic device only after a placeholder representing the external content item is displayed.

17. A method of operating a mobile electronic device having a display, the method comprising:

establishing a communication connection between the device and a computer system hosting an application executed on the device to display content on a display component;

receiving from a user of the device first input while a selected placeholder representing a selected content item is displayed;

in response to the first input, scrolling a first portion of the corresponding selected content item into view in the display component;

while the first portion of the selected content item is displayed:

receiving second user input;

communicating the second user input to a remote site from which the first portion of the selected content item was received, other than the host computer system; and receiving from the remote site information for updating the view of the selected content item, including one of:

identification of a second portion of the selected content item to display in response to the second user input; and an indication as to whether a side edge of the selected content item is in the view; and upon receipt of the indication that a side edge of the selected content item is in the view while the second user input continues to be received:

scrolling out of the view the first portion of the selected content item; and scrolling into the view a placeholder representing a different content item.

18. The method of claim 17, further comprising:

retrieving the first portion of the selected content item from the remote site only after the selected placeholder is displayed.

* * * * *